W. F. LAY.
PROCESS OF TREATING PEBBLE PHOSPHATE ROCK.
APPLICATION FILED MAY 1, 1914.
1,129,407.  Patented Feb. 23, 1915.
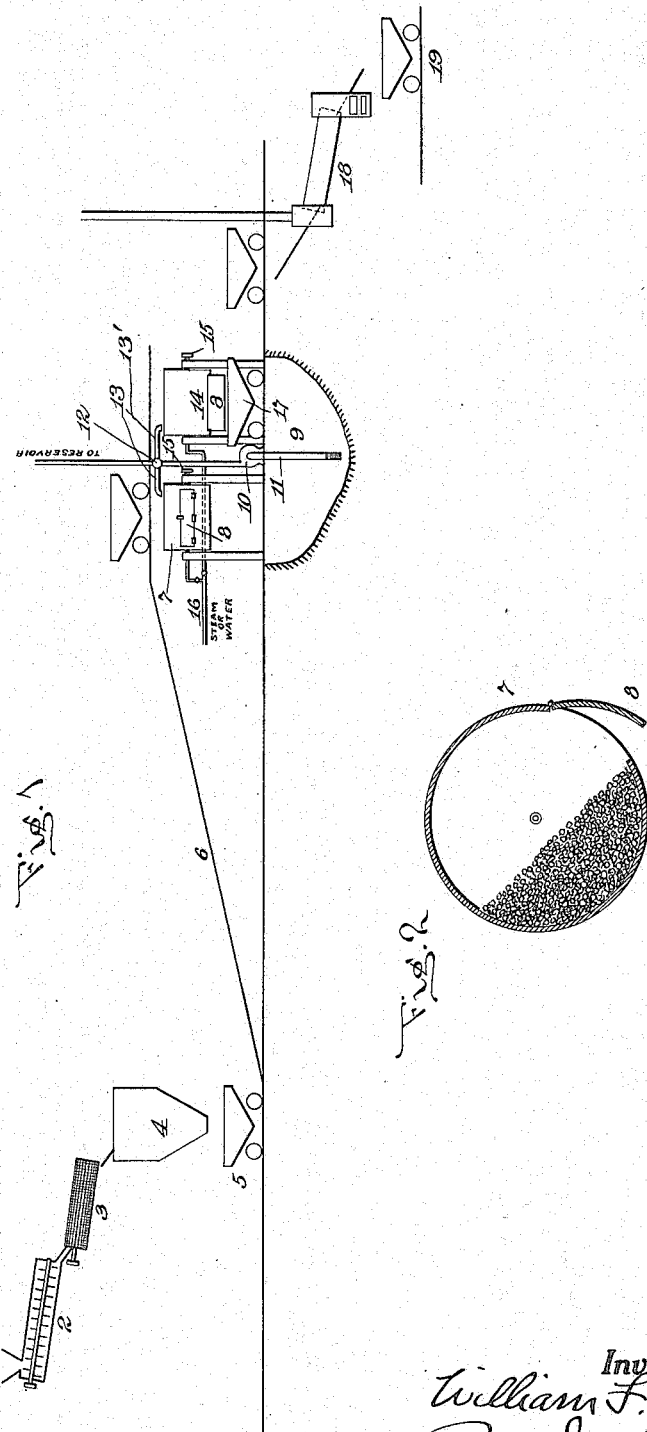
Witnesses:
Inventor
William F. Lay
By Dyer & Taylor
his Attorneys.

UNITED STATES PATENT OFFICE.

WILLIAM F. LAY, OF BOSTON, MASSACHUSETTS.

PROCESS OF TREATING PEBBLE PHOSPHATE-ROCK.

1,129,407.         Specification of Letters Patent.     Patented Feb. 23, 1915.

Application filed May 1, 1914. Serial No. 835,627.

*To all whom it may concern:*

Be it known that I, WILLIAM F. LAY, a citizen of the United States, residing in the city of Boston, county of Suffolk, State of Massachusetts, have invented a certain new and useful Process of Treating Pebble Phosphate-Rock, of which the following is a specification.

This invention relates to processes of treating pebble phosphate rock and the objects of the invention are to eliminate the objectionable foreign matter adhering to the pebbles and thereby filling the interstices thereof, and to increase the percentage of phosphoric acid in the marketable product.

Another object of the invention is to secure a greater porosity of the material so that it is in a very friable condition and is more readily prepared for the grinding machinery of the fertilizer manufacturer.

These and further objects will more fully appear from the following specification and accompanying drawings, which illustrate one form of apparatus for carrying out my process.

In the drawing, Figure 1 is a diagrammatical view of a plant suitable for carrying out the process; and Fig. 2 is a sectional view of a rotary tank by which certain parts of the process are carried out.

In both views, like parts are designated by the same reference numerals.

The pebble phosphate is found in nature in the form of pebbles or nodules embedded in a matrix below a layer of sand. This matrix is usually a variety of lime stone and is easily disintegrated by the hydraulic process. As pebble phosphate is mined in this country, so far as I am aware, the pebbles are cleaned of the sand and adhering matrix in a rotary washer and the sand and solid substances are separated from the pebbles by means of a screen, the clean pebbles being received in a wet bin, or tipple, from which they are removed to a suitable drier. After being dried, they are shipped from the mine to centers where they receive the final treatment. The pebbles when cleaned according to the usual process are, nevertheless, contaminated with a certain amount of foreign substances. This foreign substance fills up the pores and interstices in the pebbles or nodules, and unites with the phosphate in such a manner that it is not readily separated therefrom. I find that the foreign matters consist of various clays, such as silica clay, pipe clay, kaolin. Calcium carbonate and other materials of an alkaline nature are also present. In addition, it carries with it iron and alumina which are very objectionable substances and reduce the value and marketability of the phosphate pebble. The clays, alumina and other foreign substances are intimately associated with the alkaline materials and are cemented together and to the pebble by the alkaline materials. According to my invention I neutralize and dissolve the alkaline matter which will free the clay and other foreign substances from the pebbles so that they can be washed out by a subsequent operation. By the elimination of the clay, iron, alumina and other substances deposited in the pores and crevices of the pebbles and nodules, I increase the percentage of phosphoric acid in the final product.

One way of carrying out the process is illustrated in the drawings.

The phosphate deposit is mined by means of a stream of water from a hydraulic monitor or "giant". The matrix is thereby disintegrated and the pebbles and nodules are freed from their bed and at the same time are washed clean to a certain extent. The pebbles are then introduced into a washer 2 by any means, such as by a car 1. After being cleaned in the washer 2, they are passed through a screen 3 and the sand is thereby separated from the pebbles. From the screen 3 the cleaned pebbles pass into a wet bin or tipple, 4. From the wet bin the pebbles or nodules enter a car 5 which travels upon a track 6. The elevated portion of this track is above a tank 7. This tank is preferably cylindrical and made of a material not acted upon by acid, such as wood. It is provided with a valve, or door, 8 capable of being securely locked in closed position. The tank is supported upon an axle, or trunnions, so that it may revolve to bring the trap door 8 into such a position that the pebbles may be dropped from the car directly into the tank. Below the tank is a sump 9, so located that when the tank 7 is given a half revolution from its filling position, the door 8 may be opened, and the contents of the tank discharged into the sump, or into a car directly above the sump. At a suitable point, is a pump 10, connected to a pipe 11 entering the sump, for emptying the latter. This pipe 11 leads to a reservoir (not shown) and is provided, at a suitable place, with a three-way valve 12. In connection with this valve, there are two spouts, 13, 13'. One of these spouts is arranged so that liquid may be discharged into the tank 7, and the other so arranged as to discharge liquid into a similar tank 14. Each tank is provided with a pulley 15, or other means for rotating it. A pipe 16 leads to each tank so that steam or water may be introduced inside of the tank. The apparatus in addition comprises a car or other device 17 to effect the transfer of the cleaned pebbles from the tanks to a drier 18, and a car 19, or other suitable device, is provided for taking away the dried pebbles.

The process carried out by this apparatus is as follows: The pebbles and nodules from the tipple 4, are deposited into the car 5 carried upon the track 6 and deposited into the tank 7. A suitable quantity of acid solution is then introduced into the tank with the pebbles and nodules. The acid which I prefer to use is sulfuric acid, although muriatic acid, or some other acid, may be employed, but at a greater cost. I prefer to use about a five per cent. solution of sixty per cent. commercial sulfuric acid. The pebbles immersed in the acid solution are allowed to remain twenty-four hours, more or less, as depends upon the strength of the solution and the character of the deposit of the foreign matter upon the pebbles, and also according to the size of the nodules. The period may be reduced by increasing the strength of the solution. The expense may be reduced by decreasing the strength of the solution, but at a sacrifice of time. During the time which the pebbles remain in the solution, the tank may be rotated either continuously or intermittently, so as to bring the solution into contact with all of the pebbles and prevent the latter from massing or caking. There will also be attrition or rubbing of pebbles against one another which will tend to loosen the foreign matter therefrom. The effect of the acid solution will be to loosen and disintegrate certain portions of the foreign matter, such as the clays, and to neutralize certain portions of it, such as the alkaline matter and free certain of the foreign substances. In the case of lime and iron, the neutralization of the alkaline coating will be quite large and in such cases the lime and iron, the latter being present in the form of an oxid and therefore to a certain extent acted on by the acid, will pass off in solution in the acid solution and remain in liquid form. The tank is turned in such a position that when the door 8 is opened, the acid solution may be decanted and run into the sump 9, taking with it the foreign matters in solution and the particles of the undissolved foreign matters in suspension, but leaving the pebbles and nodules behind. The acid solution is then withdrawn from the sump and passed into the tank 14 through the spout 13', the three-way valve 12 being suitably manipulated to allow this to be done. The solution in the tank 14 may then be reinforced by fresh acid so that it is brought to proper strength and the process repeated in the tank 14 with untreated pebbles and nodules. In the meantime, the door 8 of the tank 7 is closed and water is admitted through the pipe 16 and any foreign matter not carried off in the acid solution will be washed out. The tank may be revolved during this operation, so that the pebbles may be agitated and the water be brought into contact with every portion of the mass. The water is drawn off into the sump 9 and from the sump is drawn through the pipe 11 into the reservoir before referred to, the valve 12 being suitably adjusted to permit this to be done. This washing step is repeated, if necessary, until all of the foreign matters are removed from contact with the pebbles and nodules. The clean pebbles and nodules are then passed to the car 17 and from the car into the drier 18, and thence they are removed by the car 19 or other suitable means. The water drawn off through the pipe 11 into the reservoir may be allowed to become purified of the foreign matters by settling, and this water may be utilized in cleaning the contents of the tanks 7 and 14 through the pipe 16. If desired, steam may be introduced through the pipe 16 to either of the tanks, to heat the acid solution. This will have the effect of reducing the time necessary to secure a separation of the foreign matter from the pebbles and nodules. It is to be understood that the strength of the acid must be varied in accordance with the conditions.

Some deposits carry a much larger quantity or proportion of large pebbles or nodules than others do, and these larger nodules or pebbles have more depressions or interstices, and are more porous than the smaller pebbles; they carry more foreign substance and require a longer time for treatment or a stronger solution for liberating and disintegrating the foreign matter. It is to be understood that the acid does not attack the phosphate rock in any manner. The only action of the acid is upon the iron, and the alkaline material, and such action will liberate the other foreign matter covering the pebbles and nodules.

According to my invention, certain material which may have such a low phosphoric acid content as not to command a ready sale in the market has, by reason of the elimination of certain portions of the material, its percentage of phosphoric acid raised and its value increased. To illustrate: Material having a content of from 68% to 70% phosphoric acid is not in demand while that containing from 70% to 75% is in good demand. According to my invention, the material containing 68% to 70% can, by the elimination of foreign substances, be raised up to 71% and 73%. The demand is greatly increased and the treated pebbles will command from a dollar to a dollar and a half per ton more than the 68% to 70% pebbles. By raising the 70% and 75% material to 72% and 77% it will command from a dollar and a half to two dollars per ton more.

The apparatus herein disclosed is not claimed in this application, but will form the subject of an application for a patent to be filed subsequently.

Having described my invention, what I claim as new and desire to secure by Letters Patent, is:

1. The process of treating pebble phosphate to increase the percentage of phosphoric acid content, which consists in immersing the pebbles, previously separated from the matrix, in an acidulated bath to separate and neutralize the alkaline foreign matters in mechanical contact with the pebbles; then separating the pebbles from the liquid.

2. The process of treating pebble phosphate to increase the percentage of phosphoric acid content, which consists in immersing the pebbles, previously separated from the matrix, in an acidulated bath to separate and neutralize the alkaline foreign matters in mechanical contact with the pebbles; then separating the pebbles from the liquid; and then washing the separated pebbles in water.

3. The process of treating pebble phosphate to increase the percentage of phosphoric acid content, which consists in immersing the pebbles, previously separated from the matrix, in an acidulated bath to separate and neutralize the alkaline foreign matters in mechanical contact with the pebbles; then agitating the bath, to prevent caking or massing of the pebbles; then separating the pebbles from the liquid.

4. The process of treating pebble phosphate to increase the percentage of phosphoric acid content, which consists in immersing the pebbles, previously separated from the matrix, in an acidulated bath to separate and neutralize the alkaline foreign matters in mechanical contact with the pebbles, said bath being heated; then separating the pebbles from the liquid; and then washing the pebbles free from the liquid.

5. The process of treating pebble phosphate to increase the percentage of phosphoric acid content, which consists in immersing the pebbles, previously separated from the matrix, in an acidulated bath to separate and neutralize the alkaline foreign matters in mechanical contact with the pebbles, then drawing off the liquid from the pebbles; then reinforcing the bath with additional acid, to maintain it at the necessary strength; then washing the separated pebbles in water; then utilizing the reinforced bath for treatment of untreated pebbles; substantially as described.

6. The process of treating pebble phosphate to increase the percentage of phosphoric acid content, which consists in immersing the pebbles, previously separated from the matrix, in a sulfuric acid bath to separate and neutralize the alkaline foreign matters in mechanical contact with the pebbles; and then separating the pebbles from the liquid.

7. The process of treating pebble phosphate to increase the percentage of phosphoric acid content, which consists in immersing the pebbles, previously separated from the matrix, in a five per cent. solution sulfuric acid bath to separate and neutralize the alkaline foreign matters in mechanical contact with the pebbles; and then separating the pebbles from the liquid.

8. The process of treating pebble phosphate which consists in separating the pebbles from the matrix; washing and screening the pebbles; immersing the pebbles in an acidulated bath to separate and neutralize alkaline foreign matters in mechanical contact with the pebbles; then drawing off the liquid from the pebbles; then reinforcing the bath with additional acid to maintain it at the necessary strength; and then washing the separated pebbles in water.

9. The process of treating pebble phosphate, which consists in immersing the pebbles previously separated from the matrix, in an acidulated bath to separate and neutralize the foreign matters in mechanical contact with the pebbles; then drawing off the liquid from the pebbles; then reinforcing the acid to maintain it at the necessary strength; then washing the separated pebbles in water, and finally drying the pebbles.

10. The process of treating pebble phosphate which consists in separating the pebbles from the matrix; washing and screening the pebbles; immersing the pebbles in an acidulated bath to separate and neutralize alkaline foreign matters in mechanical contact with the pebbles; then drawing off the liquid from the pebbles; then reinforcing the bath with additional acid to maintain it at the necessary strength; then washing the separated pebbles in water; and finally drying the pebbles.

This specification signed and witnessed this 25th day of April, 1914.

WILLIAM F. LAY.

Witnesses:
 ANNA E. RENTON,
 JAS. F. COLEMAN.